United States Patent [19]

Tamekuni et al.

[11] Patent Number: 4,977,457
[45] Date of Patent: Dec. 11, 1990

[54] AUTOFOCUS DEVICE FOR DETERMINING AN IN-FOCUS AND REAL IN-FOCUS STATE

[75] Inventors: Yasuhiro Tamekuni, Kanagawa; Takashi Amikura, Tokyo; Toru Ohara, Kanagawa, all of Japan

[73] Assignee: Canon Kabushiki Kaisha, Tokyo, Japan

[21] Appl. No.: 347,156

[22] Filed: May 3, 1989

[30] Foreign Application Priority Data

| May 10, 1988 | [JP] | Japan | 63-113096 |
| May 10, 1988 | [JP] | Japan | 63-113097 |
| Jul. 27, 1988 | [JP] | Japan | 63-187273 |

[51] Int. Cl.$^5$ .......................................... H04N 5/232
[52] U.S. Cl. .................. 358/227; 250/201.4; 354/403
[58] Field of Search ............... 358/227; 354/400, 402, 354/409; 250/201 AF

[56] References Cited

U.S. PATENT DOCUMENTS

| 4,392,726 | 7/1983 | Kimura | 358/227 |
| 4,523,829 | 6/1985 | Eguchi et al. | 358/227 |
| 4,531,157 | 7/1985 | Ishikawa | 358/227 |
| 4,531,158 | 7/1985 | Murakami et al. | 358/227 |
| 4,635,124 | 1/1987 | Andreatti, Jr. et al. | 358/227 |
| 4,706,124 | 11/1987 | Baba et al. | 358/227 |
| 4,745,425 | 5/1988 | Kusaka | 354/400 |

Primary Examiner—Stephen Brinich
Attorney, Agent, or Firm—Robin, Blecker, Daley & Driscoll

[57] ABSTRACT

Disclosed is an autofocus device, particularly an autofocus device in which focus detection is effected repeatedly. A determination is made as to whether or not a determination of the in-focus state is made continuously for a predetermined duration upon repeated detection of focus after an initial in-focus determination is made. While the determinations of the in-focus state are being made for the predetermined duration after the initial determination on the in-focus state is made, the terminals of the motor are short-circuited to apply brakes to it, and after the aforementioned duration, the motor terminals are opened, thereby stopping the motor.

17 Claims, 13 Drawing Sheets

FIG.2

| $O_1$ | $O_2$ | $O_3$ | $O_4$ | STATE |
|---|---|---|---|---|
| L | L | H | H | BRAKE |
| L | L | L | L | STOP |
| H | L | H | L | FORWARD ROTATION |
| L | H | L | H | REVERSE ROTATION |

AUTOFOCUS DEVICE FOR DETERMINING AN IN-FOCUS AND REAL IN-FOCUS STATE

BACKGROUND OF THE INVENTION

1. Field of the Invention:

The present invention relates to an autofocus device, and more particularly to an autofocus motor controlling and driving device provided in an automatic focus-adjusting system of a video camera or the like and adapted to effect control of a focus adjusting DC motor for driving a focus adjusting lens.

2. Description of the Related Art:

Conventionally, in an automatic focus adjusting system, if a distance measurement determines that the camera is in the in-focus state, a stop signal is supplied to a motor controlling and driving device, and an autofocus motor is stopped by opening or short-circuiting both terminals of the motor, thereby stopping the focus adjusting lens at the focused position.

However, in the case of the type in which the motor is stopped by opening both terminals of the motor, so-called overshooting may occur in which, even if a stop signal is output, the motor fails to stop immediately due to the inertia of the motor, thereby stopping beyond a desired stopping position. As a countermeasure against this problem, a type of speed control is effected in which the motor speed is decelerated in stages immediately before the in-focus position. However, even if such speed control is effected, it is difficult to completely eliminate the effect of the inertia of the motor, and the stopping position varies.

In addition, in order to mitigate the effect of the aforementioned inertia, brakes are applied to a motor by short-circuiting both terminals of the motor, thereby stopping the motor. In this type, however, there has been a problem in that power consumption increases.

In addition, speed control of a motor is generally effected in an automatic focus adjusting system. In other words, control is generally effected in such a manner that in cases where the stopping position deviates substantially from a focusing point, the speed before reaching the focusing point is increased by moving the motor at high speed, and when the motor approaches the focusing point, the motor speed is decreased so as to stop it within a predetermined insensitive zone with high accuracy.

If an attempt is made to improve accuracy, it is necessary to set the speed in the vicinity of the focusing point as low as is practical. However, if the speed is too low, the motor may stop midway, failing to reach the focusing point.

Conventionally, it has been necessary to set the driving conditions of the motor so that the driving is completely guaranteed under all conditions, i.e., in the presence of variations in the motor, variations in the load torque, and variations in circuits, at both low and high temperatures, and so forth. Accordingly, under most prevailing conditions, with respect to the guarantee of driving, it has been inevitable to sacrifice stopping accuracy in order to provide a large margin.

In a conventional automatic focus adjusting system, in cases where the subject is located at infinity, the lens is forcedly driven to the infinity end. It is then impossible to measure the distance accurately even if the lens is moved to the infinity end, so it is necessary to keep the lens located at the infinity end as long as the subject continues to be located at infinity. Meanwhile, if the lens is once moved to the infinity end in case of infinity, it is subsequently unnecessary to supply driving power to the motor in the direction of the infinity end, and the driving of the motor is stopped upon detection of its arrival at the infinity end.

As for the arrangement for realizing this stopping operation, there is a method whereby a switch is provided which blinks upon detection of the arrival of the lens at the infinity end, and the driving of the motor is stopped by this switch when the arrival of the lens at the infinity end is detected. In addition, there is another method whereby, while the subject is at infinity, the lens is driven in the direction of the infinity end for a fixed duration, and the lens is stopped after the fixed duration.

In different autofocus devices respectively employing the above-described two different methods, their control programs differ in accordance with the stopping methods adopted, in order to control the operation in accordance with the appropriate methods.

SUMMARY OF THE INVENTION

According to one aspect of the present present invention there is provided an autofocus device in which the terminals of a lens-driving motor are short-circuited upon detection of the state of focus so as to apply brakes to the motor, and the terminals of the motor are opened when detection of the in-focus state continues for a predetermined duration, thereby overcoming the problems of the motor stopping accuracy and power consumption.

According to another aspect of the present invention, there is provided an autofocus device in which the aforementioned predetermined duration is made variable in correspondence with the intensity of emission by light projecting means for illuminating a subject when distance measurement is carried out.

According to still another aspect of the invention, there is provided an autofocus device in which it is determined that a real in-focus state is obtained when the in-focus state is detected as the result of distance measurement after the lapse of a predetermined duration upon the initial detection of the in-focus state.

According to a further aspect of the invention, there is provided an autofocus device in which a lens-driving motor is set in a high-speed driving state when it is determined during a focus-detecting operation that the position of the lens is remote from a focused point by a predetermined amount or more, the motor is set in a low-speed driving state when it is determined during the focus-detecting operation that the position is less than the predetermined amount, and the motor is stopped when it is determined during the focus-detecting operation that the in-focus state is obtained, wherein the state of driving is forcedly shifted to the high-speed driving state when the low-speed driving state has continued for a predetermined duration.

According to still further aspect of the invention, there is provided an autofocus device which is controlled by a program having steps in which, in a state in which distance measurement is impossible such as when a subject is located at infinity, a lens is driven in the direction of infinity for a fixed duration upon detection of the aforementioned state of distance measurement being impossible, subsequently, the lens driving is stopped when a predetermined input value is shown in terms of the input state upon detecting the input state of a computer terminal, and the lens is driven in the direction of infinity when the input state shows an input value different from the aforementioned predetermined input value.

The above and other objects and features of the invention will become apparent from the following detailed description of embodiments thereof taken in connection with the accompanying drawings.

BRIEF DESCRIPTION OF THE DRAWINGS

FIG. 2 is a diagram illustrating the output states of a controller 10 shown in FIG. 1;

DETAILED DESCRIPTION OF THE PREFERRED EMBODIMENTS

Figure 1:
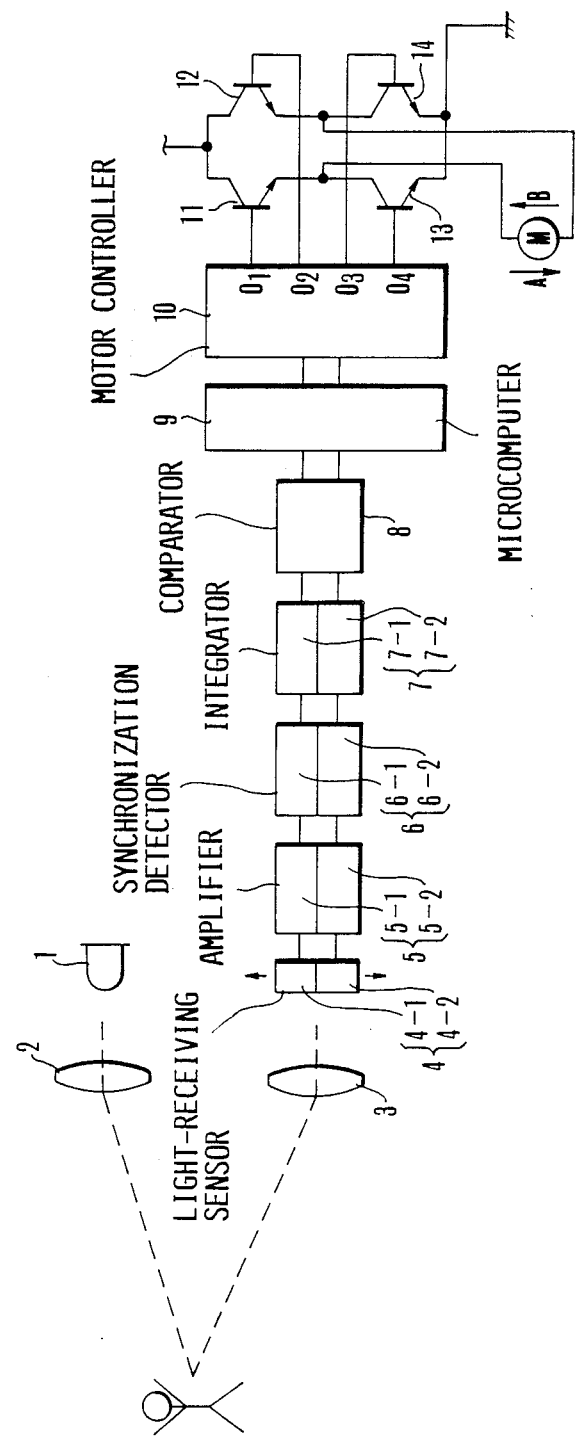
FIG. 1 is a block diagram illustrating an embodiment of an autofocus device in accordance with the present invention.

FIG. 1 is a block diagram illustrating an embodiment of the present invention.

In FIG. 1, infrared light emitted from an infrared light-emitting diode 1 is transmitted through a projection lens 2 and reflected by the subject's surface, and some of it consequently is made incident upon a light-receiving sensor 4 via a light-receiving lens 3. This light-receiving sensor 4 is divided into two parts, i.e., first and second sensor portions 4-1 and 4-2. Here, the amounts of light incident upon the sensor portions are respectively converted into electrical signals and are sequentially output to amplifiers 5 (5-1, 5-2), synchronization detectors 6 (6-1, 6-2), and integrators 7 (7-1, 7-2) that are respectively provided with respect to the two sensor portions. The amounts of light received by the sensor portions are thus respectively determined as outputs of the integrators 7 (7-1, 7-2), which are then compared by a comparator 8. In these procedures, a known signal processing is carried out, and a signal is output to a microcomputer 9 as a signal representative of distance measurement. A microcomputer 9 to which this distance measurement signal is input determines whether the state at this time is the in-focus state or the out-of-focus state, and outputs this information to a motor controller 10. Then, the motor controller 10 outputs motor control signals, such as those shown in FIG. 2, from output terminals $O_1$-$O_4$, thereby controlling the energization of a motor M.

At this juncture, when the output terminals $O_1$, $O_3$ of the motor controller 10 are at high level, while the output terminals $O_2$, $O_4$ thereof are at low level, transistors 11, 14 are ON and the transistors 12, 13 are OFF. Thus, a current flows to the motor M in the direction of the arrow A, so that the motor M rotates, for instance, forwardly. Meanwhile, when the output terminals $O_1$, $O_3$ are at low level and the output terminals $O_2$, $O_4$ at high level, the transistors 11,14 are OFF and the transistors 12, 13 are ON. As a result, a current flows to the motor M in the direction of the arrow B, so that the motor M rotates reversely.

In addition, when the output terminals $O_1$, $O_2$, $O_3$ and $O_4$ are at low level, the transistors 11, 12, 13 and 14 are OFF. In other words, this is a state in which both terminals of the motor M are opened, so that the motor M stops. In addition, when the output terminals $O_1$, $O_2$ are at low level and the output terminals $O_3$, $O_4$ are at high level, the transistors 11, 12 are OFF and the transistors 13, 14 are ON. In other words, this is a state in which both terminals of the motor M are short-circuited, so that the motor M stops suddenly. In short, brakes are applied.

Referring now to the program flowcharts shown in FIGS. 3 to 5, a description will be given of control of the above-described motor M.

Figure 3:
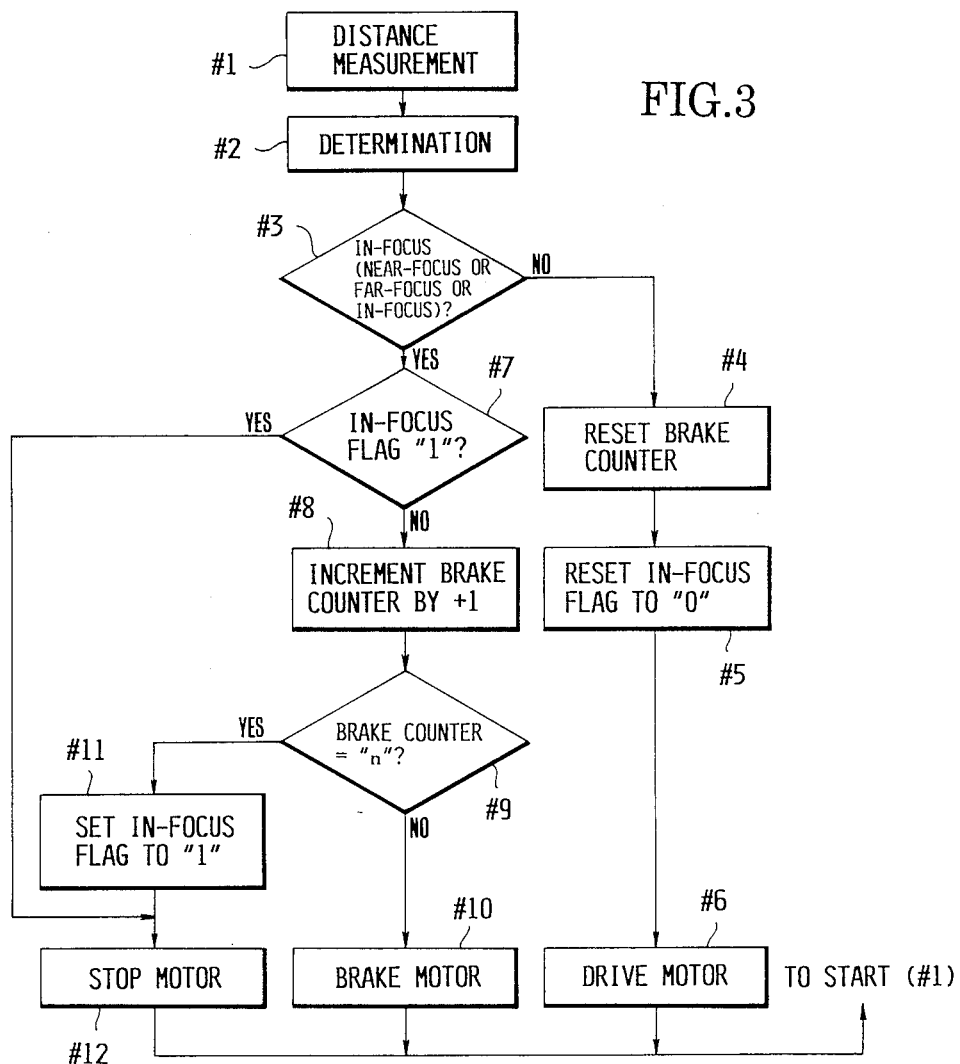
FIG. 3 is a flowchart illustrating the program flow provided for the autofocus device of FIG. 1.

FIG. 3 illustrates an embodiment in which a determination is made that a true in-focus state is obtained when in-focus signals are continuously input an n-number of times (n being a value of two or more), and brakes are continuously applied an (n−1) number of times immediately after the in-focus. A description will be given of the operation with reference to this flowchart.

First, the infrared light-emitting diode 1 is driven, as described above, to initiate the distance measuring operation, and a determination is made as to whether or not the state of focus at this time is the in-focus state (Steps #1 to #3). If the state is determined to be the out-of-focus state, the step proceeds to Step #4 where a brake counter is reset, an in-focus flag is then reset to "0", and a motor control signal such as the one described above is output, thereby rotating the motor M forwardly or reversely (Steps #5, #6).

The distance measuring operation is effected as follows: In Step #1, the light-emitting diode 1 is driven to blink, and outputs of the first sensor portion 4-1 and the second sensor portion 4-2 in the sensor 4 are respectively amplified. Then, the amplified outputs are respectively integrated by the integrators 7 (7-1, 7-2) with respect to a fixed period of time in synchronism with the blinking of the light-emitting diode 1, the relative magnitude of the outputs of the integrators 7 (7-1, 7-2) is determined by the comparator 8, and the result of comparison is input to the microcomputer 9. In Steps #2 and #3, the microcomputer 9 determines the in-focus or out-of-focus state on the basis of the result of comparison. Specifically, this determination is performed as follows: For instance, when the output of the integrator 7-1 is greater than that of the integrator 7-2, the state is determined to be a near-focus (out-of-focus) state. Conversely, if the output of the integrator 7-2 is greater than that of the integrator 7-1, the state is determined to be a far-focus (out-of-focus) state, and when the outputs of 7-1 and 7-2 are substantially identical, the state is determined to be the in-focus state.

When the state is determined to be the near-focus state in Step #6 on the basis of the above-described determining operation, a high-level signal ("H") is output from the output terminals $O_1$, $O_3$ of the controller 10, while a low-level signal ("L") is output from output terminals $O_2$, $O_4$ so as to rotate the motor M forwardly, thereby moving a photographic lens in the direction in which the near-focus state is corrected. Conversely, in the case of the far-focus state, "H" is output from the output terminals $0_2$, $0_4$ of the controller 10 and "L" from the output terminals $0_1$, $0_3$ so as to rotate the motor M reversely, thereby driving the photographic lens in the direction opposite to that described above. Incidentally, it is assumed that the sensor 4 is displaced in the direction of the arrow in interlinked relation with the movement of the photographic lens.

After the motor M is driven in Step #6, the step returns to Step #1, and the distance measuring operation is subsequently carried out continuously. When it is determined in an ensuing result of distance measurement that the state is the in-focus state, the step proceeds from Step #3 to Step #7, where a determination is made as to whether or not the in-focus flag is "0". At this early point of time, since the flag remains reset to "0", the step proceeds to the next Step #8 where the count of the brake counter is incremented by "+1", and the step then proceeds to Step #9 to determine whether or not the count of the brake counter has reached "n". If "n" has not been reached, the step proceeds to Step #10 where the output terminals $0_3$, $0_4$ of the controller 10 are set to "H" and the output terminals of $0_1$, $0_2$ at "L", thereby short-circuiting both terminals of the motor M, i.e., applying brakes to the motor M. On the other hand, if the count of the brake counter has reached "n" after in-focus signals are input continuously, the step proceeds to Step #11 to set the in-focus flag to "1". In Step #12, the output terminals $0_1$, $0_2$, $0_3$ and $0_4$ of the controller 10 are set to "L" so as to change both terminals of the motor M in the open state, thereby stopping the motor M.

Subsequently, if the in-focus state is maintained, the stopping operation is continued with both terminals of the motor 10 set in the open state.

Thus, in this embodiment, since brakes are applied to the motor during a predetermined duration after the determination concerning the in-focus state is made, and the motor is opened after fixed duration, the problems of the in-focus accuracy and power consumption can be overcome.

Figure 4:
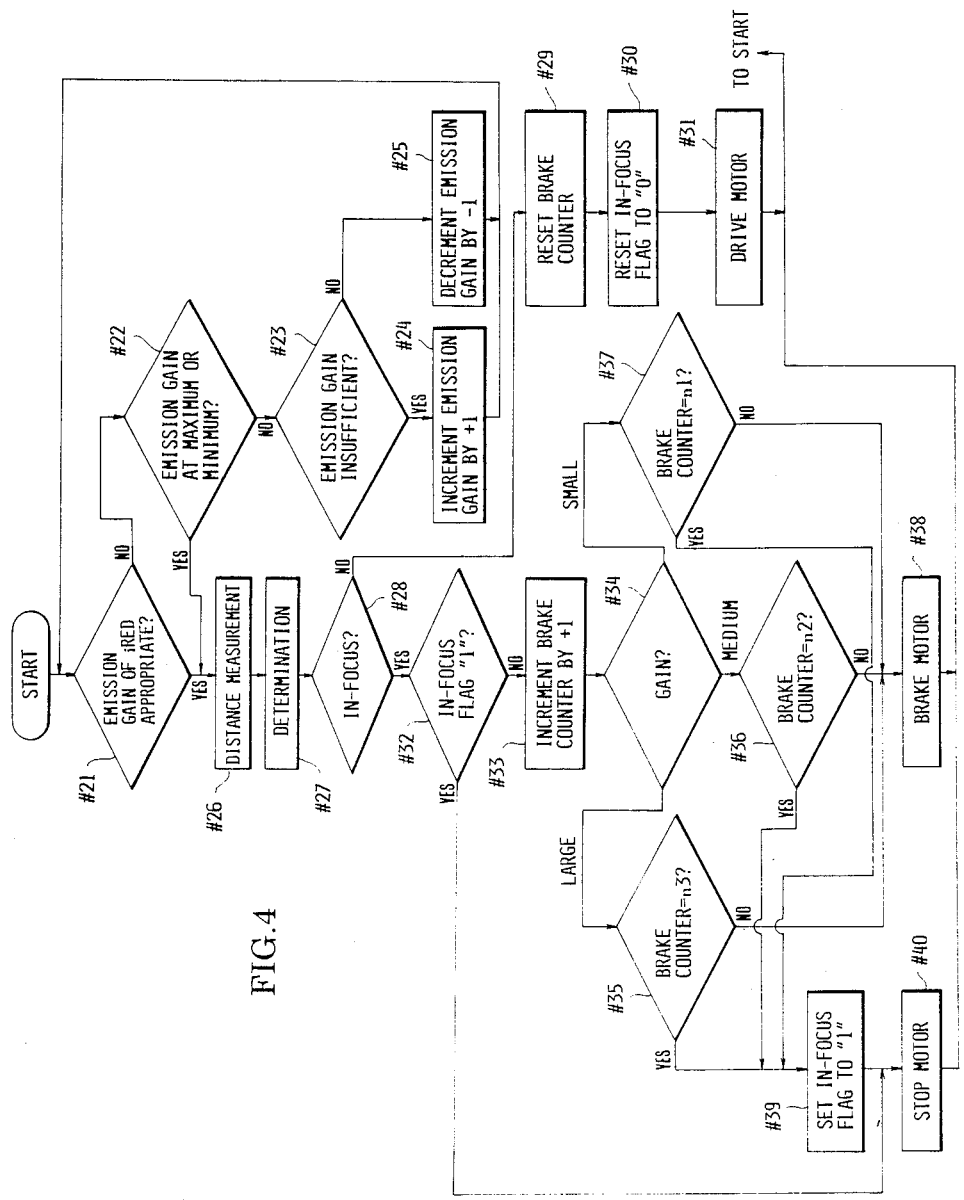
FIGS. 4 and 5 are flowcharts illustrating other examples of the above program flow.

FIG. 4 is a flowchart illustrating the program flow in accordance with another embodiment of the present invention. The arrangement shown in FIG. 1 is used as the arrangement of the autofocus device which is controlled on the basis of that flowchart.

A description will now be given of the operation of this fourth embodiment.

If the program is started, Step #21 is executed. In Step #21, a determination is made as to whether or not the emission gain of the light-emitting diode (iRED) 1 is appropriate, and if the gain is appropriate, the step proceeds to Step #26, and, if inappropriate, the step proceeds to Step #22. It is assumed that, at the time of the initial execution of Step #21, the step proceeds to Step #26 without making a determination of the appropriateness or inappropriateness of the gain.

In Step #26, the distance measuring operation and a determination of the out-of-focus state (the near-focus state or the far-focus state) and the in-focus state are executed in Steps #26, #27 and #28 in the same way as Steps #1, #2 and #3. In the distance measuring operation in Step #26, it is assumed that a sum of integration values concerning the first and second sensor portions 4-1, 4-2 is determined in addition to the calculation based on the operation of the aforementioned Steps #1 and #2 in FIG. 3. If it is determined that the state is the out-of-focus state, Steps #29, #30 and #31 are executed in the same way as Steps #4, #5 and #6, thereby driving the photographic lens in the direction of the focusing point. Then, the step returns to the start to execute Step #21 again. At the time of execution of Step #21 for the second time and thereafter, a determination is made as to whether or not a sum of integration values determined in the aforementioned Step #26 is a value falling within a predetermined range of values, $A_1$–$A_2$. ($A_2 > A_1$) If the sum is within the range of $A_1$–$A_2$, the step proceeds to Step #26, and in the other cases, the Step proceeds to Step #22. In Step #22, a determination is made as to whether or not the aforementioned sum indicates a predetermined maximum value or a predetermined minimum value. In the aforementioned case, the step proceeds to #26, and in the other cases the step proceeds to Step #23. In Step #23, the operation proceeds to Step #24 when the aforementioned sum is smaller than $A_1$, and to Step #25 when it is greater than $A_2$. In Step #24, the aforementioned sum is incremented by $+1$, while in Step #25 the sum is decremented by $-1$. In Step #24, after Step #25 is executed, the step proceeds to Step #21 again, and a determination is made as to whether or not a signal presenting the sum as a result of execution of Steps #24 or #25 has fallen within the range of $A_1$–$A_2$ Consequently, the sum signal is controlled in Steps #21 – #25 in such a manner as to fall within the range of $A_1$–$A_2$. The sum signal thus controlled is used as a signal for determining the gain, i.e., the intensity of emission, of the light-emitting diode (iRED) 1 during an ensuing distance-measuring operation.

After Steps #21 to #25 are executed, as described above, Steps #26, #27 and #28 are executed again. At this time, if the state is determined to be the in-focus state, the step proceeds to Step #34 via Steps #32 and #33. In Step #34, a determination is made as to whether the sum signal representing the gain determined as described above or the sum signal representing the gain obtained in the distance measuring operation in Step #26 is a value falling in one of ranges of $A_1$–$A_{1\text{-}1}$, $A_{1\text{-}1}$–$A_{2\text{-}1}$, and $A_{2\text{-}1}$–$A_2$. ($A_1 < A_{1\text{-}1} < A_{2\text{-}1} < A_2$) If the sum signal representing the aforementioned gain is in the range of $A_1$–$A_{1\text{-}1}$, the step proceeds to Step #37, and when it is in the range of $A_{1\text{-}1}$–$A_{2\text{-}1}$. the step proceeds to Step #36, and when it is in the range of $A_{2\text{-}2}$–$A_2$, the step proceeds to Step #35. In Steps #35–#37, a determination is made as to whether or not the value of the counter has reached a predetermined value. If NO is the answer, the step proceeds to Step #38 where brakes are applied to the motor in the same way as Step #10 in FIG. 3. Subsequently, the step returns to the start, and the above-described operations are executed repeatedly. If, during the aforementioned repeated execution of the operations, the state is repeatedly determined to be the in-focus state, Step #33 is executed by the number of times determinations of the in-focus state are made, so that the count of the brake counter increases. Then, the count has reached a count value n, $n_2$ or $n_3$, the step proceeds to Step #39.

As described, Step #37 is selected when the gain is small, Step #36 is selected when the gain is medium, and Step #35 is selected when the gain is large. At the same time, since a setting is provided such that $n_1 > n_2 > n_3$, the greater the gain, the step proceeds to Step #39 even if the number of times the state is determined to be an in-focus state continuously is small.

After the step proceeds to Step #39, the in-focus flag is set to "1", and the motor stopping operation is executed in Step #40 in the same way as Step #12 of FIG. 3.

The following is the reason why the number of continuous in-focus determinations is made variable so as to decide on the real in-focus state in correspondence with the gain of the amount of emission during distance measurement: Since a large gain of the amount of emission is selected when S/N is poor, a large number of continuous in-focus determinations is selected when S/N is good, thereby improving the stopping accuracy. If the same number of continuous in-focus determinations as the case where S/N is good is selected under conditions where S/N is poor, hunting can occur, so that number of continuous in-focus determinations is made variable in order to prevent that hunting.

Figure 5:
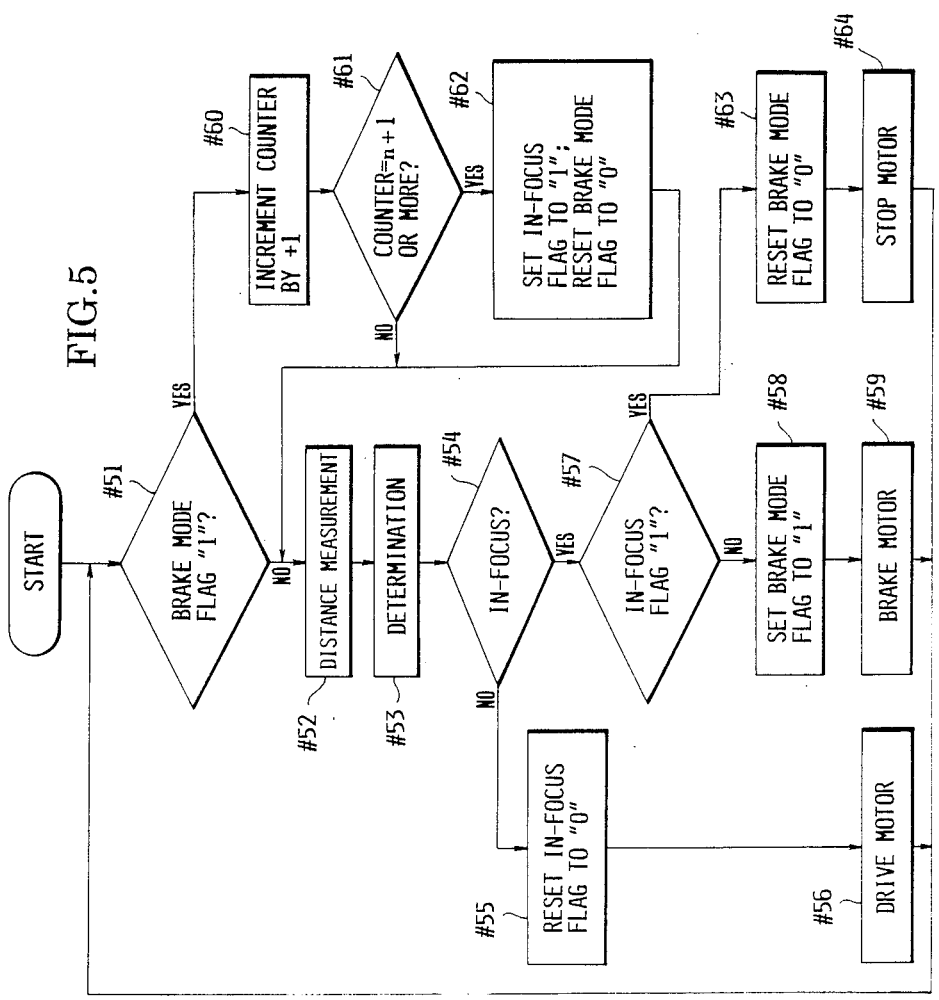

FIG. 5 is program flowchart illustrating still another embodiment of the present invention. In this flowchart, once the in-focus signal is input, control is effected in substantially the same manner as that for the embodiment shown in FIG. 3 (Steps #52–#61) so as to improve the stopping accuracy. When the in-focus signal is input for the (n+1)st time, the state is determined to be the real in-focus state (Steps #62 →#52→#53 #54 →#57 →#63 →#64).

In this determining method, brakes are applied when an in-focus determination is made during the repeated operation of an n-number of times after the in-focus state has been obtained. At the time of an out-of-focus determination during the repeated operation of an n-number of times after the in-focus state has been obtained (although this probability is low), the count is incremented, and the motor is driven in the direction of that out-of-focus position.

Namely, in the flow of this FIG. 5, since the brake mode flag is set to "1" once the state is determined to be the in-focus state, if, in Steps #53 and #54, when the subsequent distance measuring operation is performed an (n+1) number of times, it is determined that the state is the in-focus state, the step proceeds to Steps #57, #63, and then #64, thereby executing the motor stopping operation. In addition, if, at this time, the state is determined to be the out-of-focus state, in Steps #55 and #56 the lens is driven in the direction of the in-focus position. When the in-focus determinations are made twice in a row, the motor stopping operation is executed.

To give a detailed description, since the brake mode flag is initially reset, Steps #52, #53 and #54 are executed via Step #51 so as to determine whether or not the state is the in-focus state. If it is determined to be the in-focus state, Steps #57, #58 and #59 are executed so as to effect the braking operation described in Step #10 of FIG. 3, and the step returns to Step #51. Since the brake mode flag is set to "1" in the aforementioned Step #58, Steps #60 and #61 are executed following Step #51, and the content of the counter is incremented by "1". When the count of the counter is not n+1, the step proceeds to Step #52. If the in-focus state continues in a state in which the distance measuring operation is repeated, and if the distance measuring operation is performed an (n+1) number of times, the step proceeds to Step #62 via Step #61, where the in-focus flag is set and the brake flag is set, and the step proceeds to Step #52. In addition, if the state is determined to be the in-focus state in the distance measuring operation after execution of Step #62, since the in-focus flag has been set to "1", Steps #63 and #64 are executed to perform the motor stopping operation described in Step #12 of FIG. 3.

In addition, if the state is determined to be the out-of-focus state during the execution of Steps #52, #53 and #54 after the in-focus state is once obtained and the braking operation is carried out, Steps #55 and #56 are executed to move the lens in the direction of the in-focus position. However, the operation of the aforementioned Steps #51, #60 and #61 is continued. Accordingly, once the in-focus determination is made, even if the out-of-focus state is obtained during the distance measuring operation of the (n+1) number of times, the distance measurement of the (n+1) number of times is carried out after the in-focus state is once obtained and then the aforementioned Step #62 is carried out. Accordingly, if the state is determined to be the in-focus state in the distance measuring and determining operation subsequent to execution of Step #62, Steps #57, #63 and #64 are executed, thereby performing the motor stopping operation.

Figure 6:
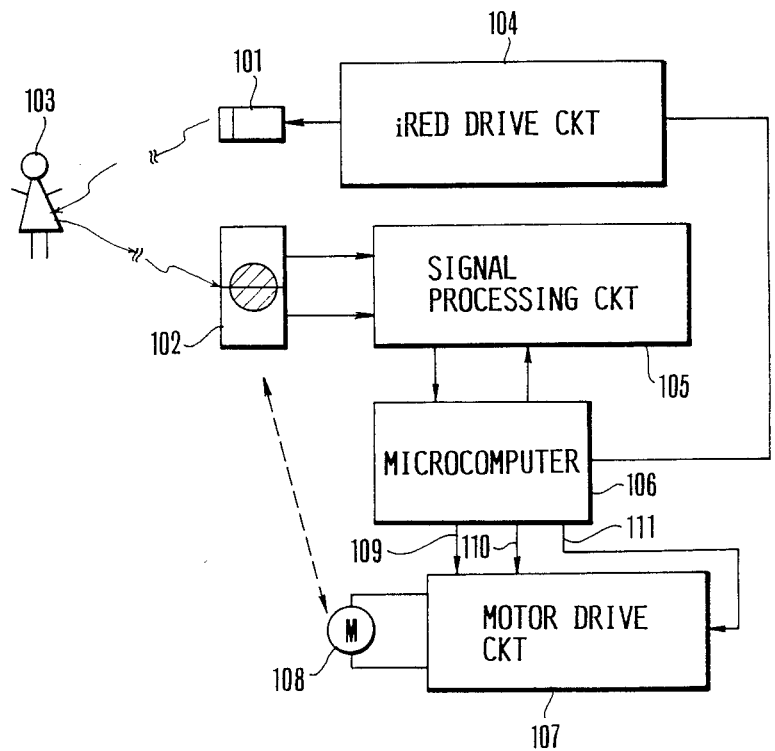
FIG. 6 is a block diagram illustrating another embodiment of an autofocus device in accordance with the present invention.

FIG. 6 is an example of an autofocus circuit illustrating a further embodiment of the present invention, in which an infrared active-type autofocus circuit is illustrated.

A light-emitting diode (iRED) 101 for projection is adapted to project infrared light toward a subject 103. A two-split-type light-receiving silicon photodiode (SPC) 102 is adapted to receive reflected light issued from the iRED 101 so as to effect photoelectric conversion. Reference numeral 103 denotes a subject. An iRED drive circuit 104 causes the iRED 101 to blink in synchronism with a clock signal from a microcomputer 106 which will be described later. With respect to the outputs of split portions of the SPC 102 which has received infrared rays, a signal processing circuit 105 effects signal processing, including amplification, synchronous detection, and integration, by means of a two-channel amplifier, and outputs the result of A/D conversion to the microcomputer 106. The microcomputer 106, which is a sequence controlling microcomputer, supplies clock signals to the iRED drive circuit 104 and receives an output of the signal processing circuit 105. Furthermore, after performing operations, the microcomputer 106 outputs drive signals 109, 110 and a speed control signal 111 to a motor drive circuit 107 and drives the lens until the in-focus state is obtained.

The motor drive circuit 107, upon receipt of the motor drive signals 109, 110 from the microcomputer 106, controls the driving of an AF motor 108, including movement in the direction from very close to infinity, from infinity to very close, and stop. In addition, the speed of the AF motor 108 is changed over by the speed control signal 111 from the microcomputer 106. The AF motor 108 moves the SPC 102 and distance ring (not shown) for driving the photographic lens, in interlinking relationship.

As described above, the drive signals 109, 110 are output from the microcomputer 106 and are used to drive the AF motor 108. When the drive signal 109 is at high level and the drive signal 110 is at low level, the AF motor 108 moves in the direction from very close to infinity. When the drive signal 109 is at low level and the drive signal 110 is at high level, the AF motor 108 moves in the direction from infinity to very close. When both drive signals 109 and 110 are at low level, the AF motor 108 is in the stopped state. In addition, the aforementioned speed control signal 111 is used for controlling the speed of the AF motor 108, and when the signal 111 is at low level, the AF motor 108 is driven at high speed, and when the signal 111 is at high level, the AF motor 108 is driven at low speed.

Figure 7:
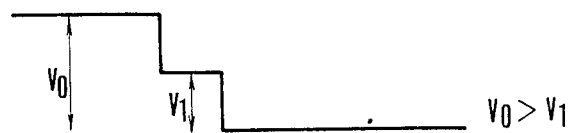
FIGS. 7, 8 and 9 are waveform diagrams illustrating the operation of the embodiment shown in FIG. 6.

FIG. 7 illustrates an example of the motor speed-controlling voltage which is actually applied to the AF motor 108.

When the position is substantially offset from the in-focus position, a voltage $V_0$ is applied to the AF motor 108, driving the AF motor 108 at high speed. When the state approaches the in-focus state, the voltage applied to the AF motor 108 is dropped to $V_1$ ($<V_0$), controlling the speed of the AF motor 108 to low speed.

Figure 8:
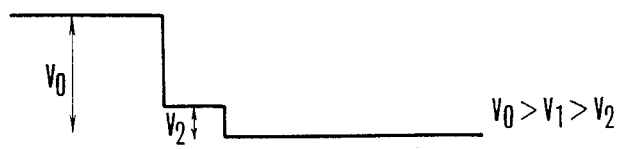

FIG. 8 illustrates another example of the speed controlling voltage which is similar to the one shown in FIG. 7. In this example, the voltage on the low-speed side is set to $V_2$ ($V_1$).

If a comparison is made between FIG. 7 and FIG. 8, the speed of the AF motor 108 on the low-speed side is lower in the case of FIG. 8. If it is assumed that all the other conditions are identical, variations in the stopping position of the lens are smaller in a case where the speed on the low-speed side is low, i.e., in a case where the speed controlling voltage on the low-speed side is $V_2$, as shown in FIG. 8. Accordingly, it is desirable to set the speed controlling voltage on the low-speed side as low as is practical. However, if the voltage is set too low, there are cases where the lens stops before reaching the in-focus position at low speed under the worse conditions (e.g., variations in the motor, low or high temperature, and variations in voltage setting).

Figure 9:
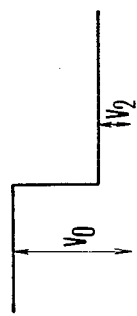

FIG. 9 illustrates an example of terminal voltage of the motor when the AF motor 108 is locked.

Under the conditions where the AF motor 108 is locked (stops) when the terminal voltage of the motor has dropped, the AF motor 108 cannot effect driving, with the result that the SPC 108 and the lens barrel (not shown) stop before the in-focus state is obtained, and, at the same time, since the voltage $V_2$ continues to be applied to the AF motor 108, the current continues to flow.

Figure 10:
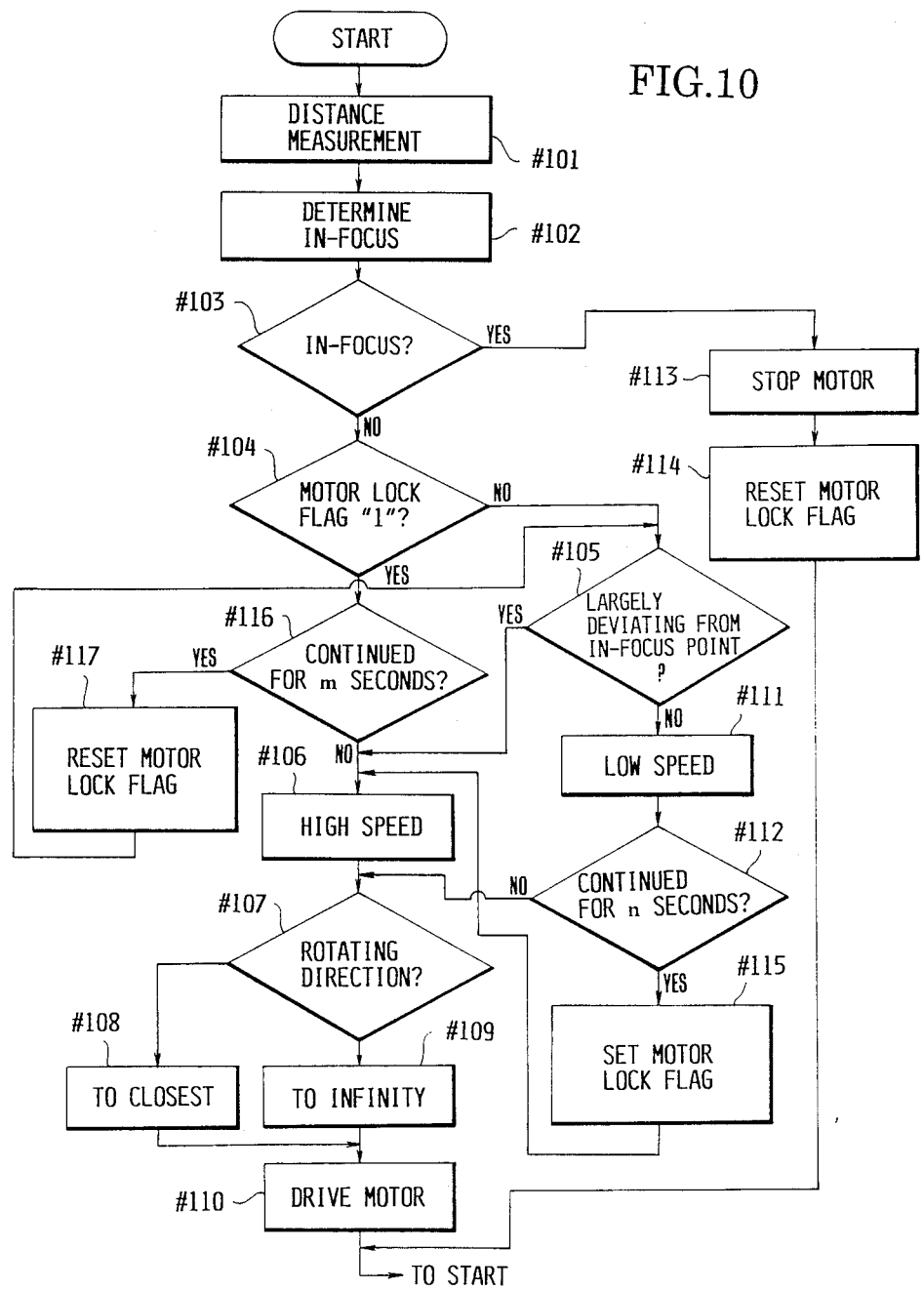
FIG. 10 is a program flowchart illustrating the operation of the embodiment shown in FIG. 6.

A description will now be given of the operation of the embodiment shown in FIG. 6 for overcoming the above-described problem with reference to the program flowchart shown in FIG. 10. It should be noted that this flowchart is incorporated in the microcomputer shown in FIG. 6.

In Step #101, distance measurement is carried out. This distance measuring operation is effected in a substantially similar manner to that for the first embodiment. In Steps #102 and #103, the result of distance measurement is determined, and if it is determined that the state is the out-of-focus state, the step proceeds to Step #104. In Step #104, a determination is made as to whether or not a motor lock flag is "1". Since the flag has been reset in the early stage, the step proceeds to Step #105. In this step, it is determined on the basis of the result of distance measurement to what extent the position deviates from the in-focus position, and if it deviates largely, the step proceeds to Step #106.

In other words, in the distance measurement in Step #101, the outputs of the respective portions of the two-split SPC 102 are independently subjected to amplification and synchronous detection in synchronism with the lighting of the iRED 101. Then, the outputs of the split portions of the SPC 102 are respectively integrated with respect to a fixed duration, and the integration values of these portions are subjected to A/D conversion and are then input to the microcomputer 106. In Step #102, the relative magnitude of the values of A/D conversion with respect to the integration values of the outputs of the split portions, and a determination is made as to whether the difference thereof is not more than a predetermined value $A_1$, falls within the range of $A_1-A_2$ ($A_2>A_1$), or greater than $A_2$, and which of the values of A/D conversion with respect to the integration values of the outputs of the split portions is greater. If it is determined in Step #105 that the result that the aforementioned difference is greater than $A_2$ is obtained as a result of calculation in Step #102, the step proceeds to Step #106. Then, if the position is found to be largely remote from the in-focus position as the result of distance measurement, Step #106 is executed. In Step #106, the speed control signal 111 is set to low level, and the voltage for driving the motor 108 by the motor drive circuit 107 is set to high level ($V_0$), thereby driving the lens at high speed. In Step #107, the direction of driving the lens is determined on the basis of the compared result of the A/D conversion value of the integration value of the outputs of the split portions determined in Step #102, and the step proceeds to either Step #108 or #109. In Step #108, the signal 109 is set to "L" and the signal 110 is set "H", thereby imparting to the drive circuit 107 the instruction of driving the lens in the direction of the closest end. In addition, in Step #109, the signal 109 is set to "H" and the signal 110 is set to "L", thereby giving the instruction of driving in the direction of infinity. Then, in Step #110, the motor 108 is driven. Subsequently, the step returns to Step #101, the above-described operation is carried out again. During the above-described series of operation, if it is determined as a result of calculation in Steps #105 and #102 that the aforementioned difference falls within the range of $A_1-A_2$, Step #111 is executed instead of Step 106. In Step #111, the signal 111 is set to "H" and the low level voltage ($V_2$) is indicated as the drive voltage of the drive circuit 107, and then the step proceeds to Step #112. In Step #112, the count of the built-in timer is detected, and a determination is made as to whether or not the time which has elapsed from the initial execution of Step #111 has reached n seconds. If NO is the answer, the step proceeds to Step #107, and then the lens is driven by the operation of the subsequent steps. At this time, the lens is driven at low speed.

Thus, the lens is normally moved to the in-focus position in a state in which low-speed driving is being performed. The state is determined to be the in-focus state in Steps #102 and #103, and Steps #113 and #114 are executed, thereby stopping the motor 108.

On the other hand, when the lens fails to reach the focusing point even after the lapse of n seconds after the low-speed driving, it means the state in which the lens driving by the motor 108 is suspended. Accordingly, when it is detected in Step #112 that the low-speed driving has been carried out for n seconds, the step proceeds to Step #115 to set the motor lock flag, and then proceeds to Step #106 to effect a changeover from the low-speed driving state to the aforementioned high-speed driving state. Consequently, since the driving voltage of the motor becomes high, the motor becomes operative, thereby allowing the lens driving to the in-focus point to be resumed. If the state is determined to be the out-of-focus state in the distance measurement and in-focus determination in the state in which a changeover has thus been effected from low-speed to high-speed driving, Steps #102, #103, #104 and #116 are executed consecutively. Accordingly, when the in-focus state is no longer obtained after the lapse of m seconds after the mode is changed over to high-speed driving, as described above, the step proceeds to Step #117 to reset the motor lock flag, and then proceeds to Step #105 so as to repeat the above-described operation.

Thus, in this embodiment, when the in-focus state cannot be obtained even after the low-speed driving state is continued for n seconds or more, it is assumed that the motor driving is stopped, the mode is changed over to high-speed driving, and the driving of the motor is resumed, thereby making it possible to move the lens to the in-focus position.

Figure 11:
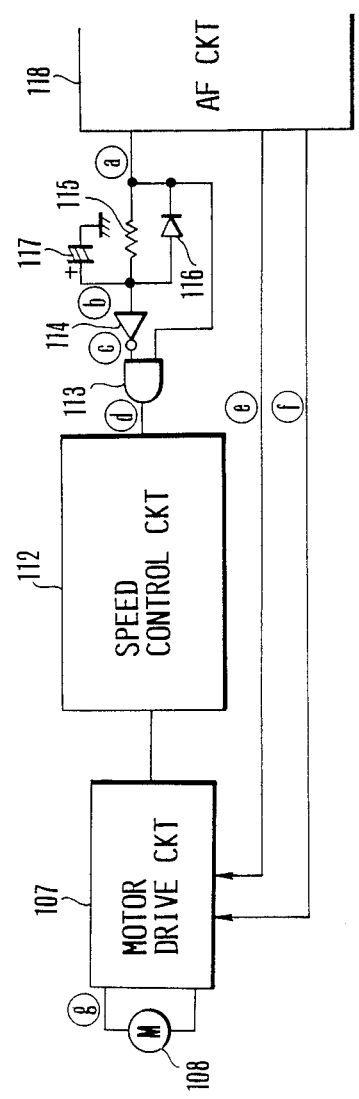
FIG. 11 is a circuit diagram illustrating another embodiment.
Figure 12:
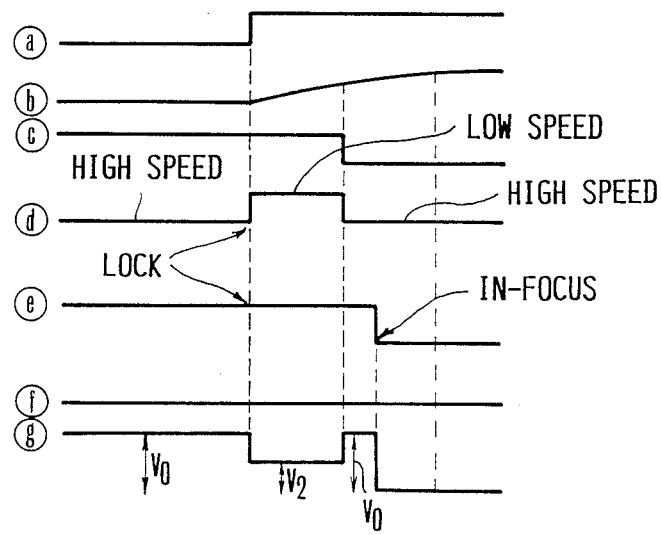
FIG. 12 is a waveform diagram illustrating the operation of the circuit diagram shown in FIG. 11.

FIG. 11 is an embodiment in which the configuration shown in FIG. 6 is realized in the form of a hardware configuration, while FIG. 12 is timing chart for FIG. 11.

In FIG. 11, an AND gate 113, an inverter 114, and a resistor 115 constitute a timer circuit together with a capacitor 117. Numeral 116 denotes a discharging diode. An AF circuit 118 is arranged to produce a speed control signal (a signal which is set to low level during high speed and to high level during low speed) (a), and direction signals (e) and (f) for instructing the driving in the direction of the closest end or infinity end.

If the AF circuit 118 detects that the state is the out-of-focus state and deviates largely from the in-focus point, the AF circuit 118 tries to move the motor 108 in the direction of the in-focus position at high speed. In other words, in such a case, the AF circuit 118 outputs signals such that, as shown in FIG. 12, the speed control signal (a) is set at low level, and the direction signals (e) and (f) are set, for instance, to high level and low level, respectively. At this point of time, the voltage applied to the AF motor 108 is $V_0$ (see (g) in FIG. 12), and all the signals (b) to (d) of various parts shown in FIG. 11 are set to low level, as shown in FIG. 12.

When the in-focus point approaches a predetermined range as the AF motor 108 rotates, the motor speed (=voltage) is controlled to low speed (voltage $V_2$), as shown in FIG. 12. At this time, the speed control signal (a) changes from low level to high level. However, the signal (c) remains at high level, while the output signal (d) of the AND gate 113 changes from low level to high level. This signal (d) is applied to the speed control circuit 112. As a result, as described before, the voltage applied to the AF motor 108 changes from $V_0$ to $V_2$ ($V_2 < V_0$), thereby controlling the speed of the AF motor 108 from high speed to low speed. This voltage $V_2$ should naturally be so designed as to function properly under normal conditions, but when worst conditions have happened to occur (e.g., all the variations have occurred on the worst side), it is possible for the driving of the motor to be impossible. In this case, simultaneously as the speed control signal (a) is set to high level, the signal (b) rises, as shown in FIG. 11, by means of a time constant formed by the resistor 115 and the capacitor 117. With respect to the time constant, if the AF motor 108 is functioning properly, the in-focus state would be obtained before the voltage of (b) reaches the threshold voltage of the inverter 114 and the signal changes to low level, so that speed control is effected properly. However, in a case where the AF motor 108 is locked by the voltage $V_2$, after a lapse of a predetermined time determined by the resistor 115, the capacitor 117, and the inverter 114, the signal (c), i.e., the output of the inverter 114, is set to low level, while the signal (d), i.e., the output of the AND gate 113, changes to low level. Upon receipt of this signal of (d) representing a change from high level to low level, the speed control circuit 112 raises the voltage applied to the AF motor 108 from $V_2$ to $V_0$, thereby restarting the motor and effecting control to rotate the AF motor 108 up to the in-focus point.

In other words, in this embodiment, when the lens fails to move to the in-focus point within a predetermined time when the low-speed drive signal for the motor is being output, an instruction is given to the motor to effect driving a high speed after the lapse of the predetermined time. Thus, an arrangement is provided such that the lens is driven positively up to the in-focus point.

Furthermore, in this embodiment, it is possible to incorporate the following arrangements: (1) The duration when the motor speed is increased above a predetermined amount is set to a predetermined duration. (2) An operation is repeated in which after the motor speed is increased for a predetermined duration until the in-focus signal is produced, the motor speed is lowered again to the lowest speed during a predetermined duration. (3) In addition to effecting control by repeating high-speed and minimum-speed control for each predetermined duration until the in-focus signal is produced, as described above, the predetermined duration is extended with a lapse of time.

Figure 13:
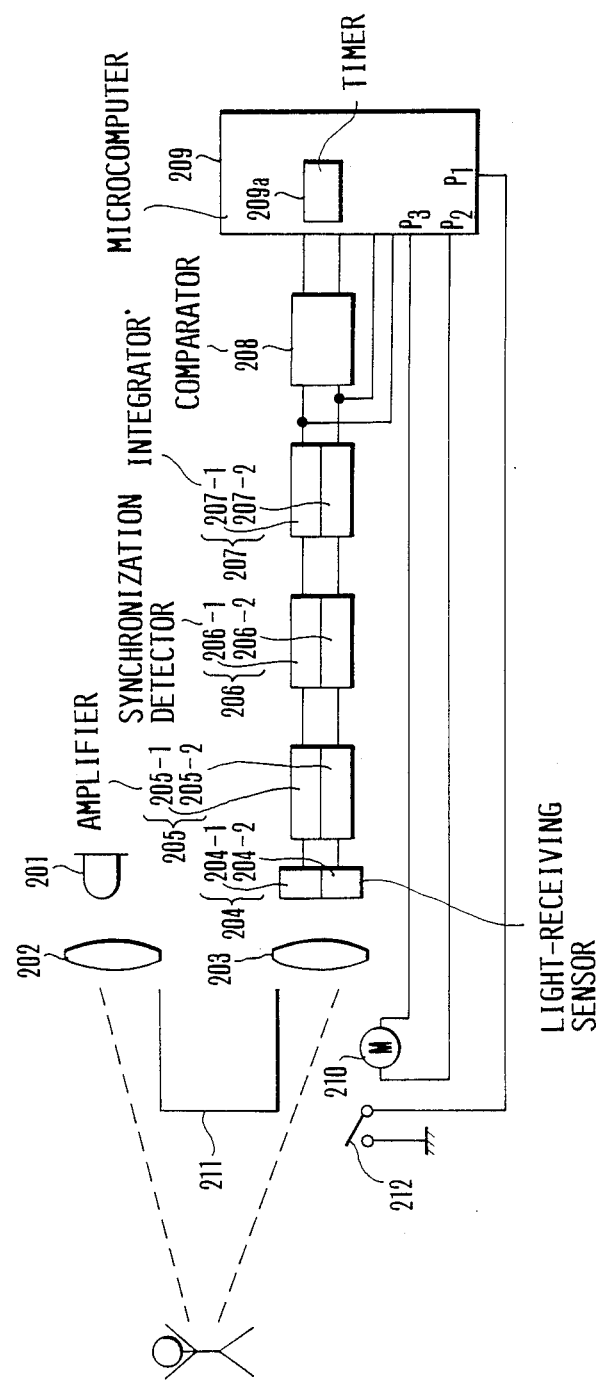
FIGS. 13 and 14 are block diagrams illustrating other embodiments of the present invention.

FIG. 13 is a block diagram illustrating an autofocus device in accordance with a further embodiment of the present invention. In the drawing, infrared light issuing from an infrared light-emitting diode 1 is transmitted through a projection lens 202, is reflected by the subject's surface, and is made incident upon a light-receiving sensor 204 via a light-receiving lens 203. At this light-receiving sensor 204, the incident light is converted into an electrical signal corresponding to the amount of incident light and is sequentially output to an amplifier 205, a synchronization detector 206, an integrator 207, and a comparator 208. Through these components, known signal processing is provided and the signal is output as an integral level to a microcomputer 209 having a built-in soft timer 209a. This microcomputer 209 to which this signal is input determines the state of focus of the focus adjusting lens on the basis of this signal, detects the level of an input to a port $P_1$, and produces a control and drive signal for a motor 210, thereby controlling and driving the motor 210. If the motor 210 begins to rotate, this output is transmitted to a distance ring 211, and the light-receiving sensor 204 and the like interlinked with the movement of this distance ring 211 move, thereby performing the focusing operation.

An infinity-end sensing switch 212 is provided on the distance ring 211, and produces a signal "L" when the focus adjusting lens reaches the infinity end, and an "H" signal at other positions.

Figure 14:
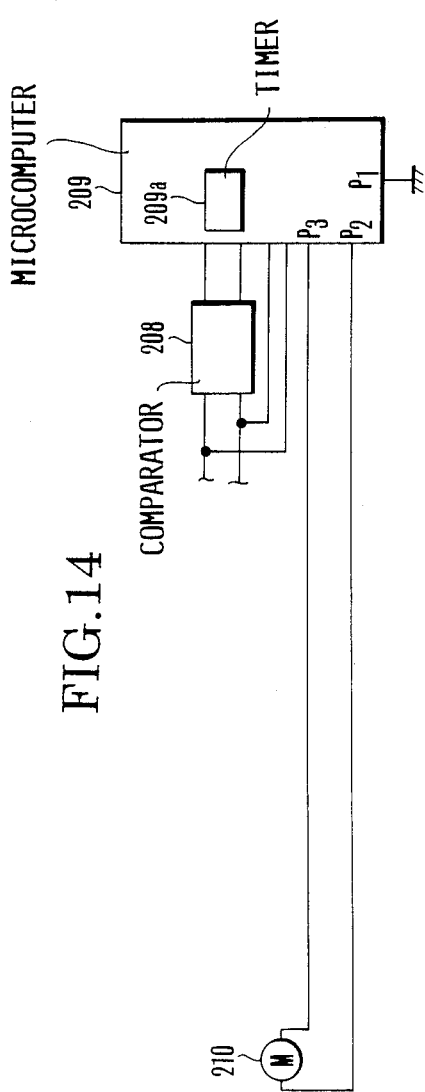

FIG. 14 is a block diagram illustrating essential parts of a further embodiment of the present invention, and those components that are identical with those of FIG. 13 are denoted by the same reference numerals.

In FIG. 14, the arrangement differs from the embodiment shown in FIG. 13 in that the port $P_1$ of the microcomputer 209 is grounded.

Figure 15:
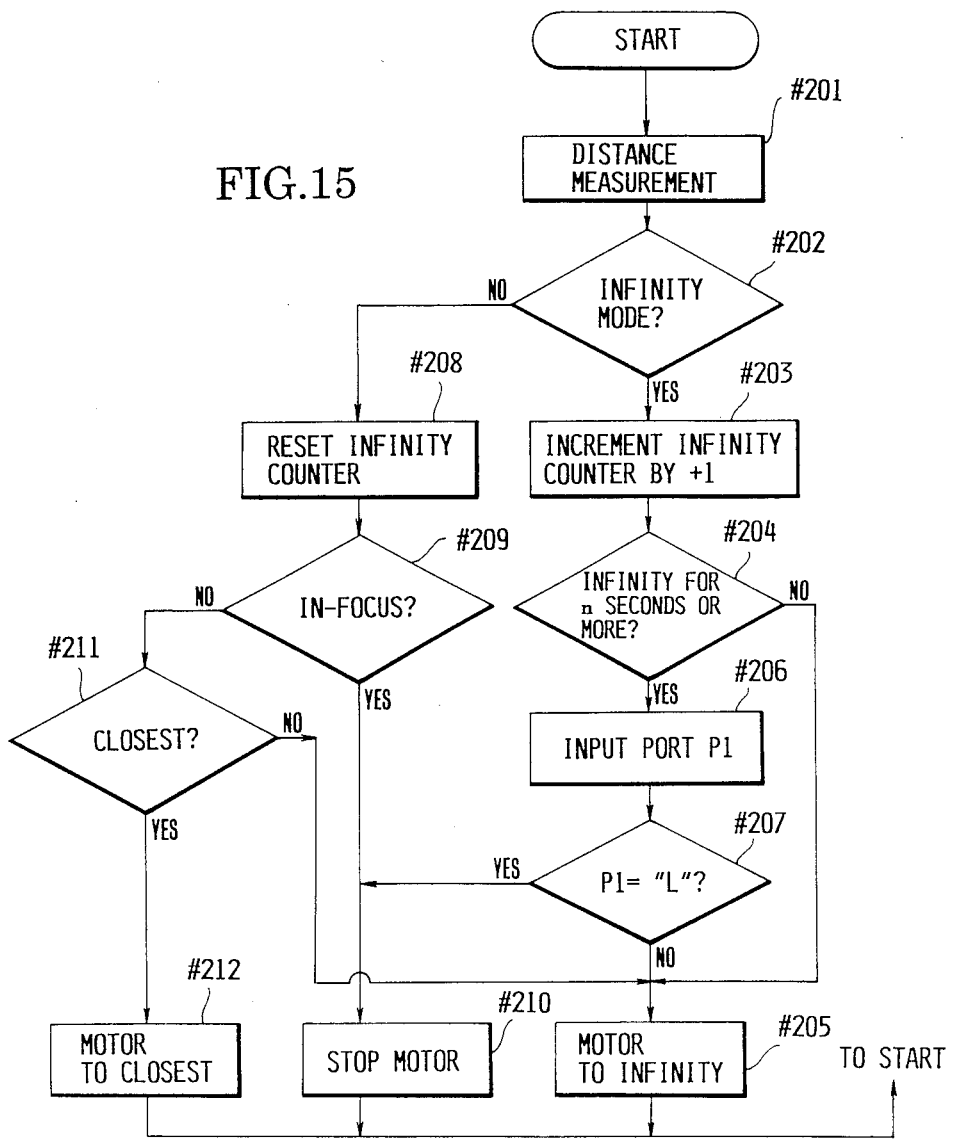
FIG. 15 is a program flowchart illustrating the operation of the embodiments shown in FIGS. 13 and 14.

FIG. 15 is a program flowchart which is used for both autofocus devices of the embodiments shown in FIGS. 13 and 14. The program of this flowchart is incorporated in the microcomputer 209 shown in FIGS.

13 and 14. First, a description will be given of the operation of the embodiment shown in FIG. 13 with reference to the program. In Step #201, the distance measuring operation is carried out, and a determination is made in Step #202 as to whether or not the mode is the infinity mode. This determination is made depending on whether the sum of integration levels of the integrator 207 (7-1, 7-2) is not more than a predetermined value. Namely, even if light is applied by the light-emitting diode 201 to the subject located at infinity, the amount of that reflected light becomes small, so that the output of the integrator 207 also becomes small. Thus, when the sum of the outputs of the integrator #207 is not more than a predetermined value, it is determined that the mode is the infinity mode. If it is assumed that the mode is determined to be the infinity mode, in Step #203, the infinity counter is incremented by 1. In Step #204, a determination is made as to whether or not the count has reached a predetermined value n, i.e., whether or not the duration of n seconds necessary for counting the count $n_1$ during the counting operation of the counter has elapsed. When the n seconds has elapsed, the step proceeds to Step #205. In Step #205, an instruction is provided to the motor 210 to drive the lens in the direction of infinity. Hence, as the motor 210 rotates, the distance ring 211 is made to drive the lens in the direction of infinity. Subsequently, the step returns to the start, and the steps are repeated again, starting with Step #201. At the time of repeating the aforementioned steps starting with Step #201, if it is determined in Step #204 that the lens is held in the state of the infinity mode for n seconds or more, the step proceeds to Step #206. In Step #206, the microcomputer 209 fetches the signal representing the status at that time via the port $P_1$ to which the state signal of the infinity-end sensing switch 212. If this signal is "L", the motor 210 is stopped in Step #210, while if it is "H", the driving in the direction of infinity is continued. Accordingly, even if the distance ring 211 is rotated in the direction of the closest end through a manual operation in a state in which the motor 210 is stopped at the infinity end, a determination is made that the infinity end is not detected by the infinity-end sensing switch 212 insofar as the mode is the infinity mode. Accordingly, the motor 210 is driven again in the direction of infinity in correspondence with the result of distance measurement made at that time.

Meanwhile, if a device which is not provided with the infinity-end sensing switch, such as the one used in the embodiment shown in FIG. 14, is operated in accordance with the program flow of FIG. 15, since the port $P_1$ of the microcomputer 209 is grounded, the mode is determined to be the infinity mode in Step #202, so that the step proceeds forcedly from Step #207 to Step #210 after the lapse of n seconds, thereby stopping the motor 210.

As described above, in accordance with the program shown in FIG. 15, even an autofocus device of the type having a totally different configuration, such as the ones shown in FIGS. 13 and 14, it is possible for its functions to be attained satisfactorily. In other words, in the case of the device having the infinity-end sensing switch, it is possible to demonstrate its functions satisfactorily, and insofar as the mode continues to be the infinity mode, the lens can be constantly moved to the infinity end. Meanwhile, in the case of the device not having the aforementioned switch, at the time of the infinity mode, the arrangement allows the lens to be moved to the infinity end by suing the same program.

In the above-described embodiments, a type in which the amount of automatic focusing up to the in-focus point is determined is shown as an autofocus device. However, the present invention may be adopted in an autofocus device of the type in which a distance to the subject is determined.

What is claimed is

1. An autofocus device having a first determination circuit for determining whether or not a lens is in an in-focus state on the basis of a focus detection result detected by a focus detection circuit, in which the lens is driven in the direction of an in-focus position when determination of the in-focus state is not made by said first discrimination circuit, said device comprising:
    (A) a second discrimination circuit for determining whether or not the determination of the in-focus state has been effected by said first discrimination circuit for a predetermined duration or more;
    (B) a motor circuit for driving the lens in the direction of an in-focus position when the determination of the in-focus state is not made by said first determination circuit, said motor circuit having a first control state in which motor terminals are short-circuited when the determination of the in-focus state has been made by said first determination circuit and a second control state in which said motor terminals are opened when a determination has been made by said second determination circuit that the determination of the in-focus state has been made for the predetermined duration or more.

2. An autofocus device according to claim 1, wherein said focus detection circuit repeatedly effects a focus-detecting operation, wherein said first determination circuit determines the in-focus state on the basis of the focus detection result in the repeated focus-detecting operation, and wherein said second determination circuit determines that the determination of the in-focus state has been made for the predetermined duration or more when determinations of the in-focus state made by said first determination circuit are carried out a predetermined number of times.

3. An autofocus device according to claim 1, further comprising projection means for projecting light onto a subject, said focus detection circuit being adapted to detect focus by detecting light reflected from the subject in a projected state, and said predetermined duration being determined in correspondence with a state of projection of said projecting means.

4. An autofocus device according to claim 3, wherein said state of projection is intensity of projection.

5. An autofocus device according to claim 2, wherein said second determination circuit has a counter for counting the number of times which a determination of the in-focus state has been made by said first determination circuit.

6. A focus detecting device comprising:
    (A) a focus detection circuit for outputting a focus signal representative of a state of focus by continuously or repeatedly detecting focus;
    (B) a first determination circuit for determining an in-focus state on the basis of the focus signal output from said focus detection circuit; and
    (C) a focus signal outputting circuit for outputting real in-focus signal when the in-focus state has been determined by said first determination circuit on the basis of the focus signal obtained after the lapse of a predetermined duration from a point of time at which the in-focus state has been determined by said first determination circuit, wherein during said predetermined duration the focus detecting operation by said focus determination circuit and the determining operation by said first determination circuit are repeatedly performed.

7. A focus detecting device according to claim 6, wherein said first determination circuit makes a determination as to the in-focus state each time a focus-detecting operation is performed by said focus detection circuit, and wherein said focus signal outputting circuit is adapted to output the real in-focus signal when the in-focus state has been determined by said first determination circuit at a point of time when the focus-detecting operation has been carried out by said focus detection circuit a predetermined plurality of times after the in-focus state has been determined by said first determination circuit for the first time.

8. A focus detecting device according to claim 7, wherein said focus signal outputting circuit has a counter for counting the number of times which said predetermined plurality of times the focus-detecting operation has been carried out.

9. A focus detecting device according to claim 6, further comprising a lens drive motor circuit which drives a lens in an in-focus direction when an in-focus state is not judged by said first determination circuit, said motor circuit being adapted to short-circuit motor terminals when the in-focus state has been determined by said first determination circuit, and to open the motor terminals in response to the real in-focus signal.

10. An autofocus device comprising:
(A) a focus detection circuit for outputting a focus signal representative of a state of focus by continuously or repeatedly detecting focus;
(B) a first determination circuit for determining an in-focus state on the basis of the focus signal output from said focus detection circuit;
(C) a focus signal outputting circuit for outputting a real in-focus signal when the in-focus state has been determined by said first determination circuit on the basis of the focus signal obtained after the lapse of a predetermined duration from a point of time at which the in-focus state has been determined by said first determination circuit, wherein during said predetermined duration the focus detecting operation by said focus detection circuit and determining operation by said first determination circuit are repeatedly performed; and
(D) a lens-driving motor circuit for driving a lens in the direction of an in-focus position when the in-focus state is not determined by said first determination circuit, and for stopping driving the lens in response to the real in-focus signal output from said focus signal outputting circuit.

11. An autofocus device according to claim 10, wherein said motor circuit is adapted to short-circuit motor terminals when the in-focus state has been determined by said first determination circuit, and to open the motor terminals in response to the real in-focus signal.

12. An autofocus device according to claim 10, wherein said first determination circuit makes a determination as to the in-focus state each time a focus-detecting operation is performed by said focus detection circuit, and wherein said focus signal outputting circuit is adapted to output the real in-focus signal when the in-focus state has been determined by said first determination circuit at a point of time when the focus-detecting operation has been carried out by said focus detection circuit a predetermined plurality of times after the in-focus state has been determined by said first determination circuit for the first time.

13. An autofocus device according to claim 12, wherein said focus signal outputting circuit has a counter for counting the number of times which said predetermined plurality of times the focus-detecting operation has been carried out.

14. An autofocus device having a focus detection circuit for outputting a focus signal representative of a state of focus by continuously or repeatedly performing a focus-detecting operation, in which an amount of focusing up to an in-focus state is determined on the basis of the focus signal output from said detection circuit, and in which a lens is driven at high speed when the amount of focusing is a predetermined amount or more and the lens is driven at low speed when the amount of focusing is less than the predetermined amount, said autofocus device comprising:
(A) a changeover circuit for changing over the lens from being driven at low speed to being driven at high speed when the lens has continued being driven at low speed for a predetermined duration.

15. An autofocus device according to claim 14, further comprising:
a determination circuit for determining the amount of focusing and for outputting a first instruction signal when the amount of focusing is the predetermined amount or more and outputting a second instruction signal when the amount of focusing is less than the predetermined amount; and a motor driving circuit for applying an electric signal for imparting high driving force to a lens-driving motor in response to the first instruction signal and applying an electric signal for imparting low driving force the lens-driving motor in response to the second instruction signal, said changeover circuit being adapted to effect a changeover to the application of the electric signal for imparting high driving force to said motor when the electric signal for imparting low driving force has been applied continuously to said motor for said predetermined duration.

16. An autofocus device according to claim 15, further comprising a timer for counting the time during which the electric signal for imparting low driving force is applied to said motor, said changeover circuit being activated when the time counted by said timer has reached said predetermined duration.

17. An autofocus device having a focus detection circuit for outputting a focus signal representative of a state of focus on the basis of a received-light output of a light-receiving portion and a lens driving motor circuit for moving a lens to an in-focus position on the basis of the focus signal, said autofocus device comprising:
(A) a first determination circuit for determining whether or not a subject is at infinity on the basis of said received-light output;
(B) an infinity signal forming circuit for imparting a signal for driving said lens in the direction of infinity to said motor circuit when it has been determined by said first determination circuit that the subject is at infinity;
(C) lens position monitoring means for detecting a position of said lens and for coming into a first output state when said lens is located at a predetermined position on an infinity end side; and (D) a control circuit for causing said infinity signal forming circuit to output the signal for driving said lens in the direction of infinity in accordance with an output of said monitoring means until said monitoring means comes into said first output state after the lapse of a predetermined duration upon determination by said first determination circuit that the subject is at infinity, and for stopping the lens from being driven by said motor circuit when said monitoring means has come into said first output state.

* * * * *